Figure 8:
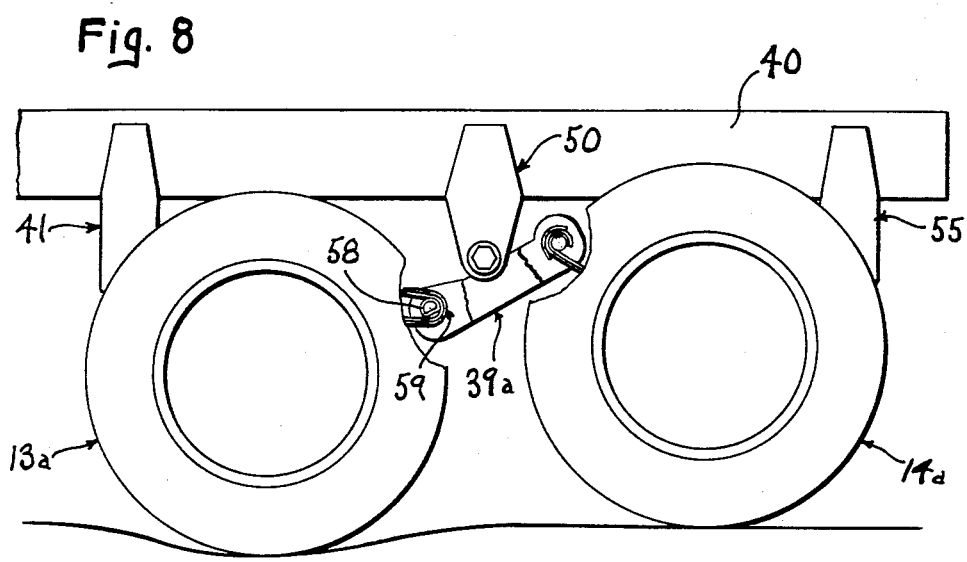

Oct. 6, 1964   J. P. FELBURN   3,151,854
RUNNING GEAR FOR VEHICLES
Original Filed June 22, 1959   4 Sheets-Sheet 1
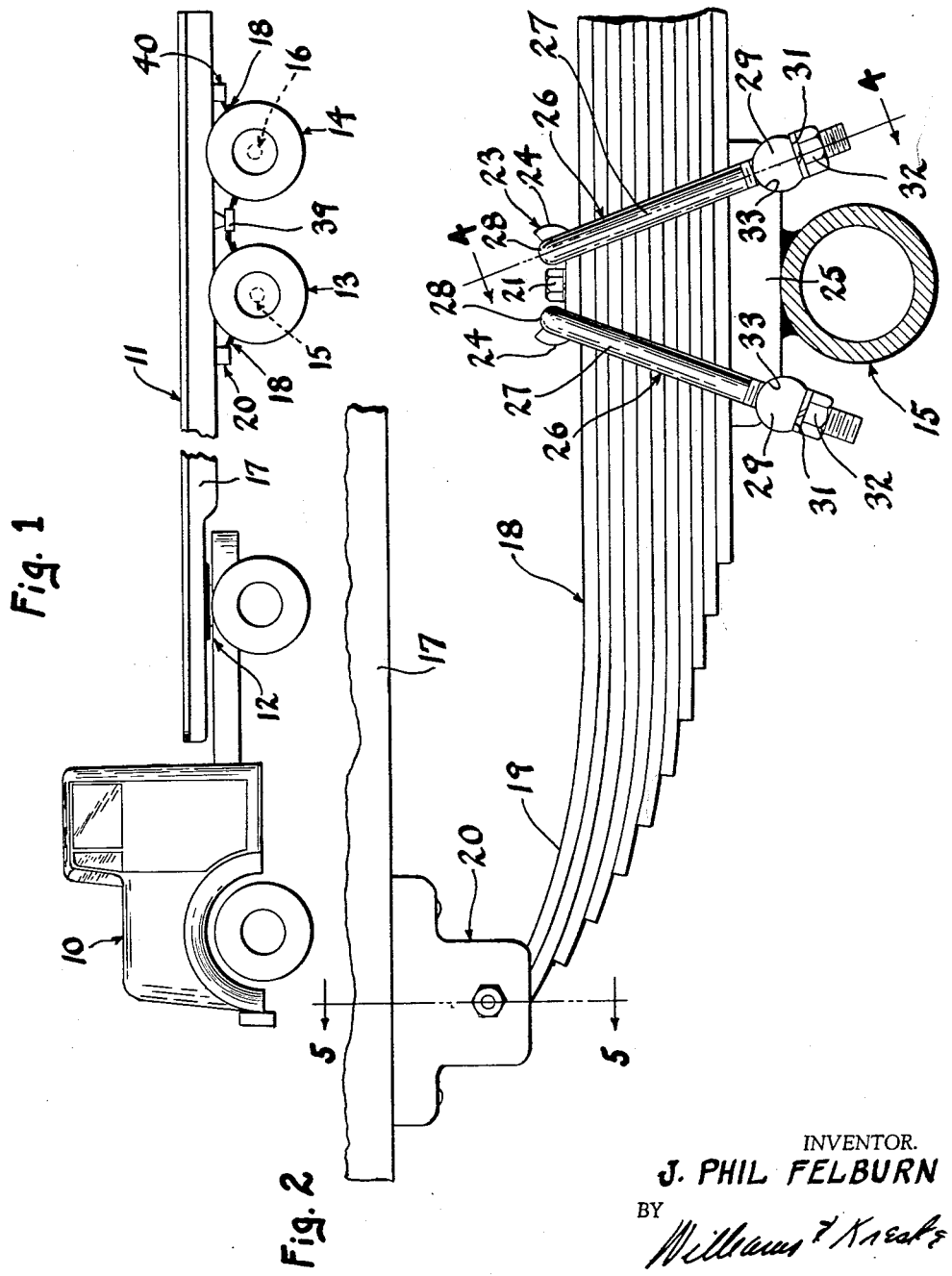
INVENTOR.
J. PHIL FELBURN
BY
Attorney

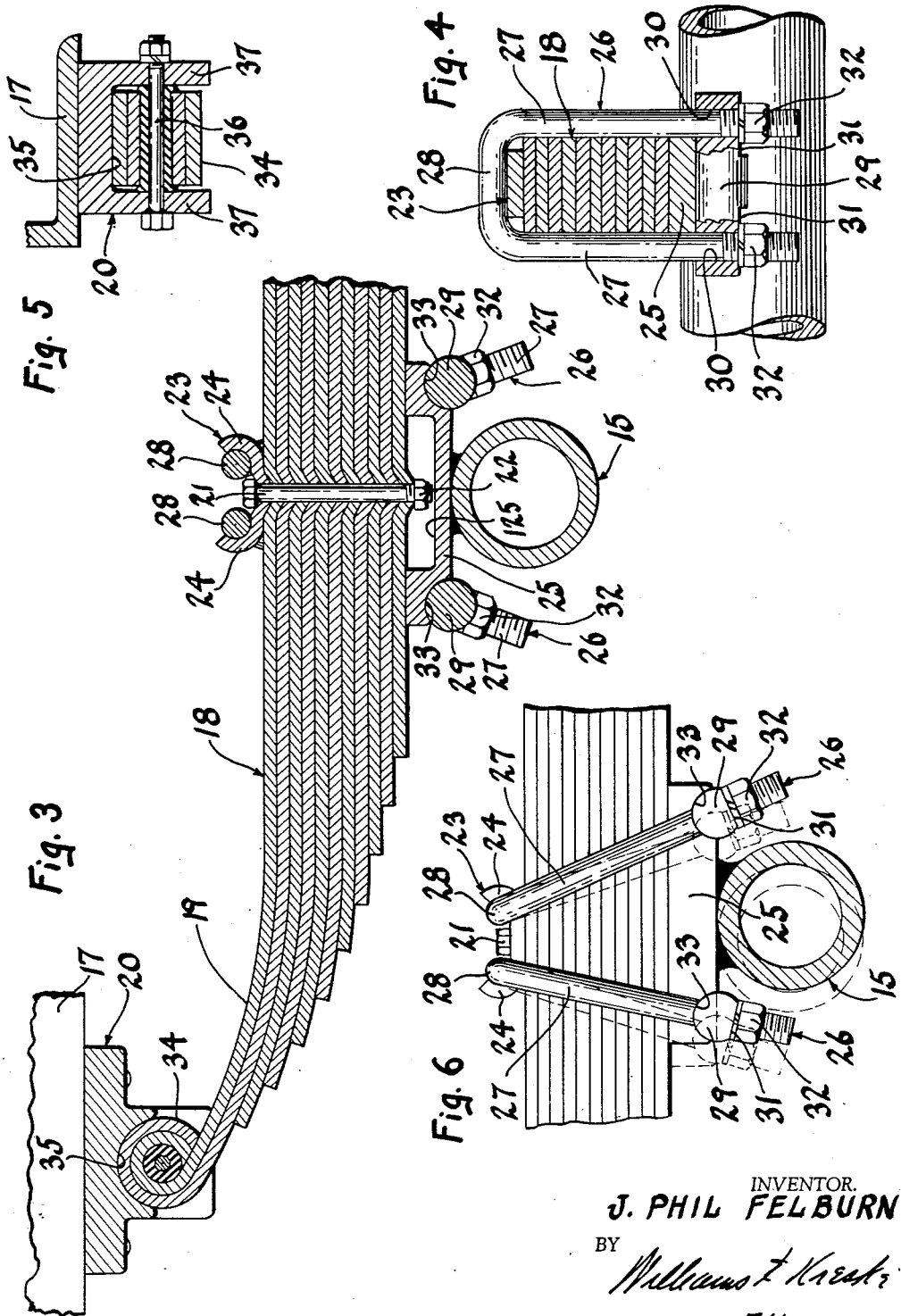

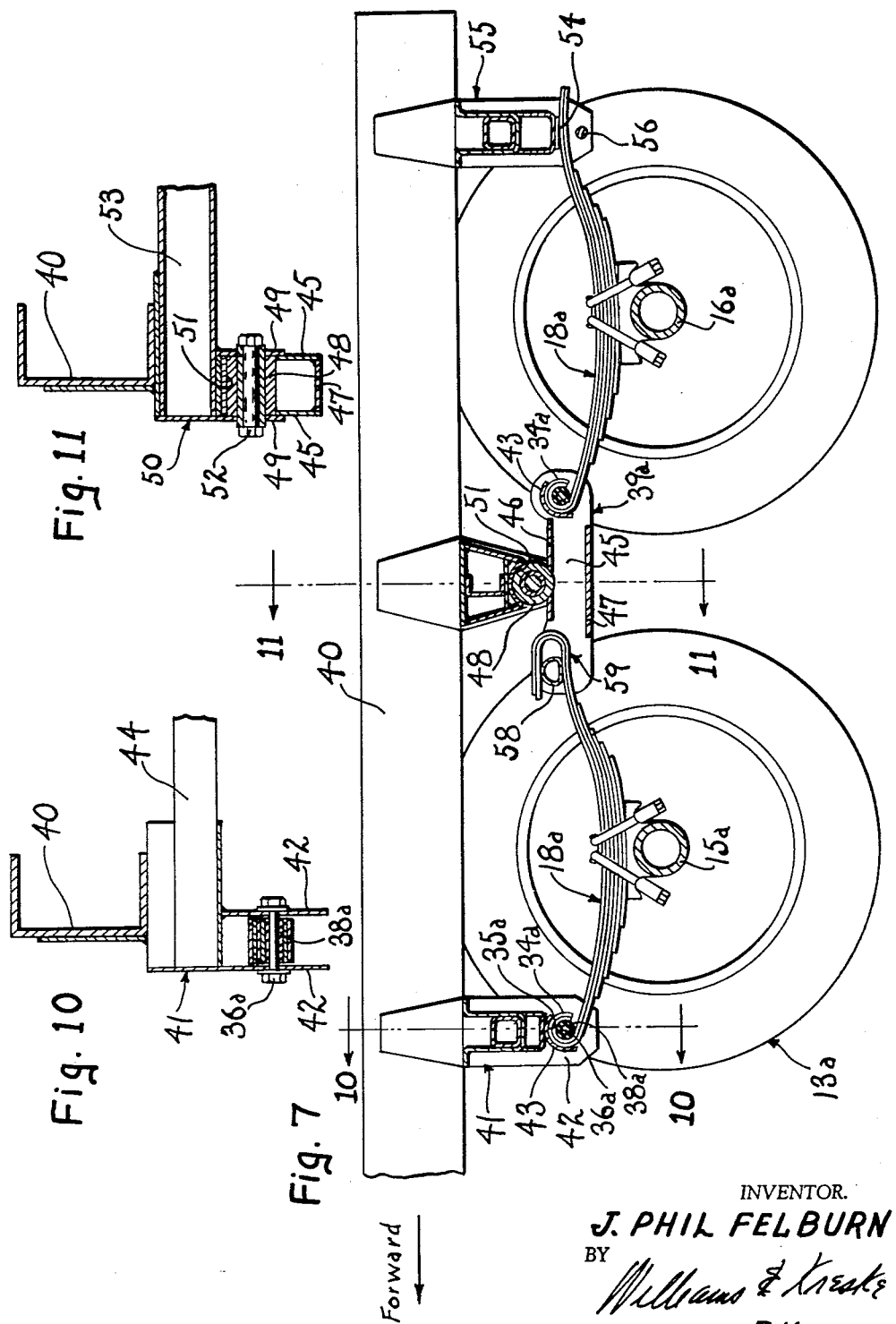

Oct. 6, 1964  J. P. FELBURN  3,151,854
RUNNING GEAR FOR VEHICLES
Original Filed June 22, 1959  4 Sheets-Sheet 4

INVENTOR.
J. PHIL FELBURN
BY
*Williams & Krecke*
Attorney

United States Patent Office 3,151,854
Patented Oct. 6, 1964

3,151,854
RUNNING GEAR FOR VEHICLES
John Phil Felburn, 4160 W. Broad St., Columbus, Ohio
Original application June 22, 1959, Ser. No. 822,151.
Divided and this application Aug. 2, 1962, Ser. No. 214,245
11 Claims. (Cl. 267—52)

The present invention relates to vehicles, more particularly to running gear constructions for use with vehicles, and the principal object of the invention is to provide new and improved constructions of such character. This application is a division of application Serial No. 822,151, now Patent No. 3,080,161, filed June 22, 1959, which application is a continuation-in-part of Serial No. 628,630, filed December 14, 1956, now abandoned.

In any vehicle, it is important that the axis about which a supporting wheel rotates be at right angles to the longitudinal axis of the vehicle (at least when the vehicle is traveling in a straight path) in order that the longitudinal axis of the vehicle be aligned with its path of travel.

In vehicles of the type having tandem wheel suspensions; that is, in vehicles having a pair of wheel carrying axles maintained in fixed angular relation with the longitudinal axis of the vehicle, it is extremely important that such axles be positioned precisely in parallelism if undue tire wear is to be eliminated.

In certain prior art constructions, respective ends of these axles are held in position by radius rods which extend from respective axle portions to the vehicle and which are adjustable in length to provide for adjustment of the angularity of each axle with the longitudinal axis of the vehicle. While these radius rods serve their intended function in holding the axle in position and providing for its adjustment, they are not entirely satisfactory since, among other disadvantages, they increase the number of parts and add to the production cost of the vehicle.

In other prior art constructions, no provision is made for adjustment of the angularity of the axle and while such constructions are desirably low in cost, they are unsatisfactory because of their lack of adjustability.

The present invention provides a foolproof, low cost construction wherein an axle may be quickly and easily adjusted for proper alignment. These and other advantages of the present invention will readily become apparent from the following description and from the drawings appended hereto.

Figure 9:
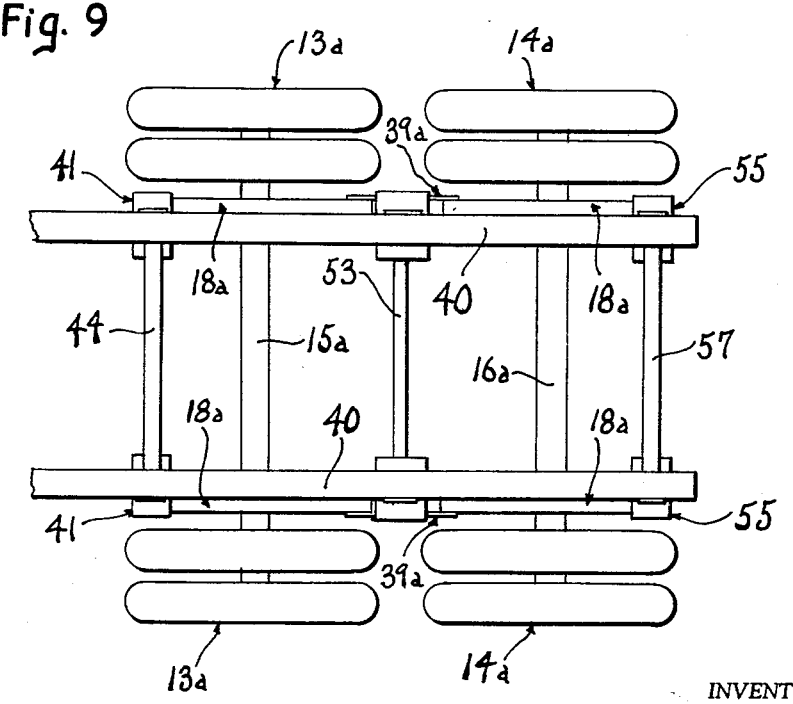

In the drawings accompanying this specification and forming a part of this application there is shown, for purpose of illustration an embodiment which the invention may assume, and in these drawings:

FIGURE 1 is a broken side elevational view of a tractor-trailer unit embodying the present invention, FIGURE 2 is an enlarged, fragmentary side elevational view of the trailer and its front axle, the wheel on the near side being removed in the interest of clarity, FIGURE 3 is a view similar to FIGURE 2 but taken along the longitudinal center line of the supporting spring to show the latter and other parts in section, FIGURE 4 is a sectional view generally corresponding to the line 4—4 of FIGURE 2, FIGURE 5 is a sectional view generally corresponding to the line 5—5 of FIGURE 2, FIGURE 6 is a fragmentary view, similar to FIGURE 2, but with the parts shown in another position of adjustment, FIGURE 7 is a fragmentary side elevational view of a trailer suspension, illustrating another embodiment of the invention, portions on the near side being removed in the interest of clarity, FIGURE 8 is a reduced side elevational view similar to FIGURE 7 but illustrating operation of the suspension when passing over an irregular road surface, FIGURE 9 is a reduced size, top plan view of the embodiment seen in FIGURES 7 and 8, FIGURE 10 is an enlarged, fragmentary sectional view generally corresponding to the line 10—10 of FIGURE 7, and FIGURE 11 is an enlarged, fragmentary sectional view generally corresponding to the line 11—11 of FIGURE 7.

While the present invention is hereinafter shown and described as being applied to a semi-trailer, it is to be understood that such use is illustrative only and that the invention may be applied to any other suitable wheeled vehicle.

In FIGURE 1 there is illustrated a tractor-trailer unit comprising a tractor 10 and a trailer 11. In this embodiment, trailer 11 is a semi-trailer; that is, the front end of the trailer rests upon and is pivotally supported by a fifth wheel structure 12 carried by the rear of the tractor. As herein shown, the rear of trailer 11 is supported by road wheels arranged in tandem, such wheels presently comprising a front set of wheels 13 and a rear set of wheels 14.

Wheel set 13 has an axle 15 and wheel set 14 has an axle 16, such axles extending transversely of the trailer's longitudinal axis and being spaced apart longitudinally thereof. In any conventional manner, each axle rotatably carries axially spaced wheels which are respectively disposed adjacent respective sides of the trailer. Each axle 15, 16 is herein shown to be connected to the frame 17 of the trailer by means of leaf springs 18, it being understood that two springs are employed for each axle and that one spring is disposed adjacent one side of the trailer while the other is disposed adjacent the other side of the trailer.

Each spring 18, see FIGURE 2, is formed of a plurality of leaves stacked one atop the other in the usual manner and the forward end 19 of each of the springs to which front axle 15 is secured is pivotally connected to the frame 17 of the trailer by means of respective brackets 20 which will later be described in detail. As best shown in FIGURE 3, the means employed to hold the spring leaves together comprises a bolt 21 which passes through aligned apertures leaves. A nut 22 is carried by bolt 21 to draw the respective spring leaves together. The portion of each spring leaf adjacent its aperture is, in the position of parts shown, provided with a depression in its upper surface and a dimple in its lower surface. The dimple of each spring leaf interfits with the depression of the adjoining leaf immediately below to insure precise alignment of the various leaves. With this construction, bolt 21 is relieved of all shearing stresses since any attempt by the leaves to slide relative to each other is immediately transmitted to a force tending to separate the leaves. This force is thereupon transmitted to bolt 21 as a tension force.

For a purpose to be disclosed, a clip 23 is presently secured to the top of spring 18 by means of bolt 21, the clip being apertured and dimpled in the same manner and for the same purpose as the spring leaves. Clip 23 is provided with upturned ends 24 which provide relatively closely spaced abutments, or pockets, which are spaced longitudinally of the spring for a purpose to appear and each spring 18 is adapted to seat against the upper surface of a spring seat 25 which is preferably of the same width as the spring and which is welded or otherwise secured to axle 15.

Each spring seat 25 is recessed at 125 (see FIGURE 3) to provide adequate clearance over nut 22 for a purpose to become clear and each spring is adapted to be drawn tightly upon its seat by means of a pair of U bolts 26. As best seen in FIGURE 4, each U bolt comprises a pair of legs 27 joined together at one end by a transversely extending portion 28. Legs 27 are spaced to straddle spring 18 and spring seat 25 and in the present embodiment, extending across the free ends of legs 27 in spaced relation to portion 28 of each U bolt, is a round bar 29 having apertures 30 for passing respective U bolt legs. The ends of each bar 29 are flattened at 31 (see also FIGURE 2) to provide a flat seat for a nut 32 which is threaded upon each U bolt leg. The transversely extending U bolt portion 28 and the bar 29 provide abutments spaced longitudinally of each U bolt for a purpose to appear.

Each U bolt is adapted to be positioned with its transversely extending portion 28 seated in the respective abutments provided by the upturned end portions 24 of clip 23 and with its bar 29 seated in arcuate pockets, or abutments, 33 which are formed in the spring seat 25 and are relatively widely spaced on opposite sides of axle 15. Note that with the parts assembled as shown in FIGURE 2, one of the U bolts is positioned in front of axle 15 whereby its lower portion inclines toward the front of the trailer while the other is positioned behind the axle whereby its lower portion inclines toward the rear of the trailer.

When the U bolts are tightened, it will be apparent that each will exert a force drawing the axle and the spring together; however, because of the inclination of the U bolts, the one on the left will also exert a force tending to move the axle along the spring toward the rear of the trailer while the U bolt on the right will exert a force tending to move the axle along the spring toward the front of the trailer. With both U bolts tightened, the rearwardly exerted force of one will be cancelled by the forwardly exerted force of the other to thereupon maintain the axle at a predetermined position along the spring.

Assuming it is desired to shift the near side of axle 15 rearwardly, or to the right, from the position shown in full lines in FIGURE 6 in order to properly position the axle with the longitudinal axis of the trailer, it is only necessary to loosen the U bolt on the right and tighten the U bolt on the left. Tightening the U bolt on the left will exert a force tending to move the axle to the right along the spring and since the U bolt on the right is loosened, there will be nothing to counteract this force. Accordingly, the axle will be shifted from the dot-dash line position shown in FIGURE 6 to the full line position shown. When the axle is positioned as desired, the U bolt on the right will be tightened to hold the axle in its adjusted position.

It will be noted that as the axle is shifted, the angularity of the U bolts necessarily change both with respect to each other and with the vertical. In the present embodiment, this change of angularity is provided for by permitting transverse portions 28, at one end of the U bolts, to rotate in the respective pockets provided by clip 23 and by permitting bars 29, at opposite ends of the U bolts, to rotate in respective pockets 33 formed in spring seat 25.

It will be understood that to move the axle to the left, or toward the front of the trailer, the U bolt on the left will first be loosened and the U bolt on the right then tightened to shift the axle. It will also be understood that the far end of axle 15 is preferably secured to its spring 18 by the same construction heretofore described and that this far end may also be adjustably positioned along its spring.

As previously mentioned, the front end 19 of each spring 18 which carries the front axle 15 is pivotally secured to the frame 17 of the trailer by means of a bracket 20. Referring to FIGURE 3, the two top leaves of the front end of spring 18 are rolled back on themselves to provide a tubular portion 34. Bracket 20 has a downwardly facing arcuate surface 35 which is formed for complementary engagement with the upwardly facing exterior portion of the tubular spring portion 34. Note that with this construction, the weight of the trailer is transmitted directly to the spring and not through a pivot pin as in prior art constructions. Note also that the pocket provided by surface 35 is of sufficient depth to maintain the tubular spring portion in position longitudinally of the trailer even under the impact of road irregularities and the like which exert a force which tends to effect movement of the tubular spring portion longitudinally of the trailer. Accordingly, the present construction eliminates the problem of pivot pin breakage frequently encounterered in the past.

Normally, the weight of the trailer will keep tubular spring portions 34 in the pocket provided by the arcuate surface 35; however, to insure against the possibility of the spring becoming dislodged during severe rebound conditions, it is held in position by a bolt 36 which passes through the tubular spring portion 34 and through aligned apertures in spaced, depending ears 37 provided by bracket 20 (see also FIGURES 2 and 5). These ears not only support bolt 36 but also confine the spring against excessive movement in a direction axially of the bolt. In the present embodiment, rubber bushings 38 are interposed between bolt 36 and the interior of tubular spring portion 34 to provide a resilient cushion therebetween.

Since the trailer herein disclosed has tandem axles, it is preferable to arrange the suspension whereby vertical movement of one axle in one direction is transmitted to vertical movement of the other axle in the opposite direction. To this end, the rear ends of the springs which carry the front axle 15 are not secured directly to the frame of the trailer but are engaged with one end of respective rock levers 39, or walking beams, which are secured to the trailer for pivotal movement about a horizontal axis. The other ends of rock levers 39 are connected to the forward ends of the respective springs 18 which carry the rear axle 16 by a construction which is similar to that employed with the forward ends of the springs which carry axle 15.

The construction employed for supporting the rear ends of springs 18 is not shown in detail in the embodiment seen in FIGURES 1 through 6 since a conventional construction may be employed. Briefly, the rear of each spring 18 is substantially flat; that is, no tubular portion is provided as is at the front. This flat portion of each spring underlies and is slidably engaged with a suitable abutment through which the weight of the trailer is transmitted to the spring. In the case of the springs which carry rear axle 16, the abutment which engages the rear of each spring is provided by respective brackets 40 carried by the frame 17 of the trailer. In the case of the springs which carry the front axle 15, the abutments are carried by the front ends of respective rock levers 39. In any event, the arrangement is such that the rear of each spring may slide relative to its abutment and in a direction longitudinally of the spring during vertical movement of the wheels in traveling over an uneven road surface and during flexure of the springs.

From the foregoing, it will be evident that in the present embodiment of the invention, the front end of each spring is located longitudinally of the trailer by means of an efficient, novel construction and that simplified and effective means are employed to connect each axle to its supporting springs whereby the axles may be easily adjusted to properly position them relative to the longitudinal axis of the trailer.

The embodiment of the invention seen in FIGURES 7 through 11 is similar to that heretofore disclosed; accordingly, similar parts are identified by the same reference characters as before but with the suffix "a" added.

As illustrated in FIGURES 7 and 9, the semi-trailer fragmentarily shown therein has longitudinally extending frame members 40 in side by side relation and to which the wheel suspension is secured. This wheel suspension is similar to that heretofore disclosed in that it comprises a front axle 15a having axially spaced-apart dual wheel sets 13a disposed on respective sides of the trailer and a rear axle 16a having axially spaced-apart dual wheel sets 14a also disposed on opposite sides of the trailer. Each axle is adapted to be secured to the trailer by means of leaf springs 18a which are generally similar to those heretofore disclosed and, as before, two springs are employed for each axle, one being disposed on each side of the trailer. The intermediate portion of each leaf spring is adapted to be secured to its axle by any suitable means such as, for example, the inclined U-bolt arrangement heretofore disclosed which provides for adjustment of the axle longitudinally of the spring for alignment purposes.

The leading end of each forward spring 18a is pivotally secured to the trailer by means of fabricated brackets 41 which depend from respective frame members 40. As best seen in FIGURE 10, each bracket is herein shown to comprise a pair of spaced side plates 42 for receiving respective spring ends therebetween. An arcuate plate 43 is welded between the side plates to provide a downwardly facing curved surface 35a which complementarily fits with the upwardly facing arcuate surface of the tubular portion 34a of the leading end of the spring. A bolt 36a passes through the tubular spring portion 34a and through aligned apertures in the bracket side plates 42 and functions in the same manner and for the same purpose as bolt 36. Also, rubber bushings 38a or the like are interposed between bolt 35a and the interior of tubular spring portion 34a to provide a resilient cushion therebetween. For strengthening purposes, a cross piece 44 extends between and connects brackets 41 together (FIGURES 9 and 10).

As in the previously disclosed embodiment, the trailing end of a front spring 18a on one side of the trailer and the leading end of a rear spring on such trailer side are engaged with respective ends of a rock lever 39a whose intermediate portion is pivoted to the trailer between the spring ends aforesaid. A similar construction, it will be understood, is employed on the other side of the trailer.

Each rock lever 39a is presently a box section fabrication having side plates 45 and upper and lower plates 46 and 47 all welded together to provide an integral structure. Each rock lever has a sleeve-like member 48 welded to its upper side to provide an upwardly facing arcuate surface similar to that provided by tubular spring portion 34a. Each rock lever 39a is disposed between spaced side plates 49 of respective brackets 50 secured to and depending from respective frame members 40. Each bracket has a portion providing a downwardly facing arcuate surface 51 which complementarily engages with the upwardly facing arcuate surface provided by respective sleeve-like members 48 to thus rotatably support respective rock levers. A bolt 52 extends through each sleeve-like member 48 and through aligned apertures of respective bracket side plates 44 to retain each rock lever assembled with its bracket. A cross piece 53 extends between and connects brackets 50 together for strengthening purposes.

The leading end of each rear spring 18a is preferably secured to the rear of a respective adjoining rock lever by means of a construction similar to that employed in securing the leading end of the front springs to the trailer. Accordingly, an arcuate plate 43 is welded between the side plates 45 of each rock lever to provide a downwardly facing curved surface which complementarily fits with the upwardly facing arcuate surface of a tubular spring portion 34a of the leading end of a respective rear spring. A bolt and rubber bushing arrangement similar to that used at the leading end of the front spring may be employed to retain the leading ends of the rear springs assembled with the respective rock levers.

The construction employed for securing the trailing ends of the rear springs 18a to the trailer may be of the well-known slip shackle type. As presently disclosed, the trailing portion of each rear spring is more or less straight, or slightly curved as herein illustrated, and each slidably engages an abutment 54 provided by a respective bracket 55 depending from respective frame members 40. Each bracket 55 provides side plates between which a respective spring is confined and a bolt or the like 56 extends between the side plates beneath the trailing end of each spring to limit movement of the spring end away from the abutment. A cross piece 57 extends between brackets 55 for rigidity.

Turning now to the novel construction for connecting the trailing end of each front spring 18a to its respective rock lever 39a, it will be noted that the forward end of the rock lever has an abutment 58 extending between the lever side plates 45. At the present time, abutment 58 is generally rounded in cross-section but has a flattened underside which rests upon and slidably engages the upper surface of the trailing end of the front spring. The trailer end of this spring is formed similar to that of the rear spring; however, such trailing end is elongated and is doubled back upon itself to provide U-shaped configuration 59 between the legs of which is confined the abutment 58.

During movement of the trailer, it will be understood that the springs 18 will flex, such flexure causing elongation and contraction of respective springs. Since the position of the leading end of each front spring is fixed longitudinally of the trailer by means of its pivot connection with its bracket 41, the trailing ends of such springs will slide longitudinally beneath the abutment 58 of the rock lever. A similar sliding movement of the trailing ends of the rear springs beneath abutments 54 of the brackets 55 will take place upon flexure of the rear springs.

During movement of the trailer over an uneven surface, vertical movement of the front wheels 13a in one direction will be transmitted to vertical movement of the rear wheels 14a in the opposite direction because of the rock lever connection between the front and rear springs. For example, and with reference to FIGURE 8, assume that the front wheels 13a have fallen into a depression during movement of the trailer. Downward movement of the front wheels will cause the trailing end of the front spring to move down and, since rock lever abutment 58 is confined between the legs provided by the U-shaped configuration 59 at the trailing end of this spring, the rock lever will be rotated in a counterclockwise direction thus pulling the leading end of the rear spring and its attached rear wheels up. A reverse action will, of course, occur when the front wheels strike a bump rather than a depression.

It is to be noted that the U-shaped configuration at the trailing ends of the front springs insures that each rock lever abutment 58 closely follows its spring end at all times because it is confined between the underlying and overlying legs provided thereby. In addition, the U-shaped configuration serves yet another purpose. Since the bight of the U-shaped configuration is at the terminal end of its spring, such bight forms a pocket which limits movement of the adjoining abutment longitudinally of the spring in a direction rearwardly thereof and thus limits rotation of the attached rock lever. This then prevents disengagement of the rock lever with the front spring, even under extremely rough road conditions at high speed, as sometime occurs with conventional suspension systems of a type somewhat similar to that herein disclosed.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. Running gear for wheeled vehicles, comprising mounting means extending longitudinally of the vehicle, axle means extending transversely of said mounting means and secured to the latter for adjustment longitudinally thereof, and a pair of elongated fastening members for securing said axle means to said mounting means and each having spaced, relatively movable portions respectively having pivotal engagement with said mounting means and said axle means to provide for pivotal movement of each fastening member in a plane extending longitudinally of said mounting means, said fastening members being disposed with their axes at an angle with each other and normally positioned with the axis of one inclined in one direction longitudinally of said mounting means and with the axis of the other inclined in the opposite direction longitudinally of said mounting means whereby each fastening member exterts a pull on said axle means both longitudinally of said mounting means in the direction of its inclination and a pull drawing said axle means and said mounting means together when its portions aforesaid are moved toward each other, said axle means being adjustable longitudinally of said mounting means by increasing the spacing between respective portions of one of said fastening members and decreasing the spacing between respective portions of said other fastening member.

2. Running gear for wheeled vehicles, comprising mounting means extending longitudinally of the vehicle and providing a first pair of seats in fixed relation with said mounting means, axle means extending transversely of said mounting means and secured to the latter for adjustment longitudinally thereof and providing a second pair of seats in fixed relation with said axle means and in spaced relation with said first seat pair, and a pair of elongated fastening members for securing said axle means to said mounting means and each having spaced, relatively movable portions each of which is pivotally engaged with a seat of respective seat pairs to provide for pivotal movement of each fastening member in a plane extending longitudinally of said mounting means, said fastening members being disposed with their axes at an angle with each other and normally positioned with the axis of one inclined in one direction longitudinally of said mounting means and with the axis of the other inclined in the opposite direction longitudinally of said mounting means whereby each fastening member exerts a pull on said axle means both longitudinally of said mounting means in the direction of its inclination and a pull drawing said axle means and said mounting means together when its portions aforesaid are moved toward each other, said axle means being adjustable longitudinally of said mounting means by increasing the spacing between respective portions of one of said fastening members and decreasing the spacing between respective portions of said other fastening member.

3. Running gear for wheeled vehicles, comprising mounting means extending longitudinally of the vehicle and providing a first pair of seats spaced-apart longitudinally of and in fixed relation with said mounting means, axle means extending transversely of said mounting means and secured to the latter for adjustment longitudinally thereof and providing a second pair of seats in fixed relation with said axle means and in spaced relation with said first seat pair and also spaced-apart longitudinally of said mounting means, and a pair of elongated fastening members for securing said axle means to said mounting means and each having spaced, relatively movable portions each of which is pivotally engaged with a seat of respective seat pairs to provide for pivotal movement of each fastening member in a plane extending longitudinally of said mounting means, the seats of one of said seat pairs being spaced-apart a greater distance than the seats of said other seat pair for positioning said fastening members with their axes at an angle with each other and said fastening members normally being positioned with the axis of one inclined in one direction longitudinally of said mounting means and with the axis of the other inclined in the opposite direction longitudinally of said mounting means whereby each fastening member exerts a pull on said axle means both longitudinally of said mounting means in the direction of its inclination and a pull drawing said axle means and said mounting means together when its portions aforesaid are moved toward each other, said axle means being adjustable longitudinally of said mounting means by increasing the spacing between respective portions of one of said fastening members and decreasing the spacing between respective portions of said other fastening member.

4. Running gear for wheeled vehicles, comprising mounting means extending longitudinally of the vehicle and providing a first pair of seats spaced-apart longitudinally of and in fixed relation with said mounting means, axle means extending transversely of said mounting means and secured to the latter for adjustment longitudinally thereof and providing a second pair of seats in fixed relation with said axle means and in spaced relation with said first pair and also spaced-apart longitudinally of said mounting means, and a pair of elongated fastening members for securing said axle means to said mounting means and each having spaced, relatively movable portions each of which is pivotally engaged with a seat of respective seat pairs to provide for pivotal movement of each fastening member in a plane extending longitudinally of said mounting means, the seats of one of said seat pairs being spaced-apart a greater distance than the seats of said other seat pair for positioning said fastening members with their axes at an angle with each other and one of said fastening members being disposed in front of said axle means and the other being disposed behind said axle means, said fastening members normally being positioned with the axis of one inclined toward the front of the vehicle and with the axis of the other inclined toward the rear of the vehicle whereby each fastening member exerts a pull on said axle means both longitudinally of said mounting means in the direction of its inclination and a pull drawing said axle means and said mounting means together when its portions aforesaid are moved toward each other, said axle means being adjustable longitudinally of said mounting means by increasing the spacing between respective portions of one of said fastening members and decreasing the spacing between respective portions of said other fastening member.

5. Running gear for wheeled vehicles, comprising mounting means extending longitudinally of the vehicle, axle means extending transversely of said mounting means and secured to the latter for adjustment longitudinally thereof, and a pair of fastening members for securing said axle means to said mounting means and each having a pair of spaced-apart, generally parallel legs and each having spaced, relatively movable portions respectively having pivotal engagement with said mounting means and said axle means to provide for pivotal movement of each fastening member in a plane extending longitudinally of said mounting means, the legs of respective fastening members straddling a portion of said mounting means and the legs of one fastening member being disposed in front of said axle means and the legs of the other being disposed behind said axle means and at an angle with respect to the legs of said one fastening member, said fastening members normally being positioned with the legs of one inclined toward the front of the vehicle and with the legs of the other inclined toward the rear of the vehicle whereby each fastening member exerts a pull on said axle means both longitudinally of said mounting means in the direction of its inclination and a pull drawing said axle means and said mounting means together when its portions aforesaid are moved toward each other, said axle means being adjustable longitudinally of said mounting means by increasing the spacing between respective portions of one of said fastening members and decreasing the spacing between respective portions of said other fastening member.

6. Running gear for wheeled vehicles, comprising mounting means extending longitudinally of the vehicle and providing a first pair of seats space-apart longitudinally of and in fixed relation with said mounting means, axle means extending transversely of said mounting means and secured to the latter for adjustment longitudinally thereof and providing a second pair of seats in fixed relation with said axle means and in spaced relation with said first pair and also spaced-apart longitudinally of said mounting means, and a pair of U bolts for securing said axle means to said mounting means and each having a pair of spaced-apart, generally parallel legs joined together at one end by a bight portion and each also having a transversely extending portion movable toward and away from its bight portion to vary the spacing therebetween, the portions aforesaid of each U bolt respectively having pivotal engagement with a seat of respective seat pairs to provide for pivotal movement of each U bolt in a plane extending longitudinally of said mounting means, the seats of one of said seat pairs being spaced-apart a greater distance than the seats of said other seat pair for positioning said U bolts at an angle with each other and one of said U bolts being disposed in front of said axle means and the other being disposed behind said axle means with the legs of respective U bolts straddling a portion of said mounting means, said U bolts normally being positioned with the legs of one inclined toward the front of the vehicle and with the legs of the other inclined toward the rear of the vehicle whereby each U bolt exerts a pull on said axle means both longitudinally of said mounting means in the direction of its inclination and a pull drawing said axle means and said mounting means together when its portions aforesaid are moved toward each other, said axle means being adjustable longitudinally of said mounting means by increasing the spacing between respective portions of one of said U bolts and decreasing the spacing between respective portions of said other U bolt.

7. Running gear for wheeled vehicles, comprising an elongated resilient member extending longitudinally of the vehicle and having respective ends connected thereto, axles means extending transversely of said resilient member and secured to the latter for adjustment longitudinally thereof, and a pair of elongated fastening members for securing said axle means to said resilient member and having spaced, relatively movable portions respectively having pivotal engagement with said resilient member and said axle means to provide for pivotal movement of each fastening member in a plane extending longitudinally of said resilient member, said fastening members being disposed with their axes at an angle with each other and normally positioned with the axis of one inclined in one direction longitudinally of said resilient member and with the axis of the other inclined in the opposite direction longitudinally of said resilient member whereby each fastening member exerts a pull on said axle means both longitudinally of said resilient member in the direction of its inclination and a pull drawing said axle means and said resilient member together when its portions aforesaid are moved toward each other, said axle means being adjustable longitudinally of said resilient member by increasing the spacing between respective portions of one of said fastening members and decreasing the spacing between respective portions of said other fastening member.

8. Running gear for wheeled vehicles, comprising a leaf spring extending in normal manner longitudinally of the vehicle, an axle extending transversely of said leaf spring and secured to the latter for adjustment longitudinally thereof, and a pair of U-bolts for securing said axle to said leaf spring, one U-bolt being disposed ahead of the axle and the other to the rear of the axle, each U-bolt encircling said leaf spring with its bight bearing against the upper surface of said leaf spring and its legs along opposite sides of said leaf spring, a clamping member between the free ends of the legs of each U-bolt and nuts on said free ends for firmly holding said clamping member against the lower surface of said leaf spring, the legs of respective U-bolts extending in diverging relation from their bights and at an angle to a vertical line normal to said leaf spring, the bight and clamping member of each U-bolt having pivotal movement at the upper and lower spring surfaces, respectively, whereby said axle is adjusted along said leaf spring by loosening the nuts on one U-bolt and tightening the nuts on the other U-bolt.

9. The construction of claim 8 wherein said leaf spring is composed of a plurality of overlying leaves and a bolt and nut connection is provided to hold said leaves assembled, said bolt having a head bearing against the upper surface of the upper leaf and the nut bearing against the lower surface of the lower leaf, and a bolt shank extending through aligned apertures in said leaves, said bolt and nut connection being located between said U-bolts.

10. The construction of claim 9 wherein each leaf is formed with a dimpled portion surrounding its aperture to form a recess on one side and a projection on the other, the projections and recesses being held in interfitting relation by the drawing action of the bolt and nut connection to relieve said bolt of shearing stresses.

11. The construction of claim 9 wherein a clip is clamped between the bolt head and the upper surface of the upper leaf, said clip having spaced pockets for pivotally receiving the bights of respective U-bolts, and wherein a seat member is rigidly secured to said axle and bears against the lower surface of the lower leaf, said seat member having spaced pockets for pivotally receiving the clamping members of respective U-bolts.

References Cited in the file of this patent

UNITED STATES PATENTS

| | | |
|---|---|---|
| 772,284 | Lukens | Oct. 11, 1904 |
| 1,255,997 | Evans | Feb. 12, 1918 |
| 1,671,668 | Cattoi | May 29, 1928 |
| 1,869,132 | Chilton | July 26, 1932 |
| 1,871,981 | Geyer | Aug. 16, 1932 |
| 1,876,924 | Hastings et al. | Sept. 13, 1932 |
| 2,678,819 | Douglass | May 18, 1954 |
| 2,745,661 | Van Raden | May 15, 1956 |